Sept. 14, 1948.                    D. S. YOUNG                    2,449,189
                                    HORSE TIE Filed Oct. 28, 1946                                        4 Sheets-Sheet 1

Inventor
David S. Young
by Frederick E. Bromley
ATTY

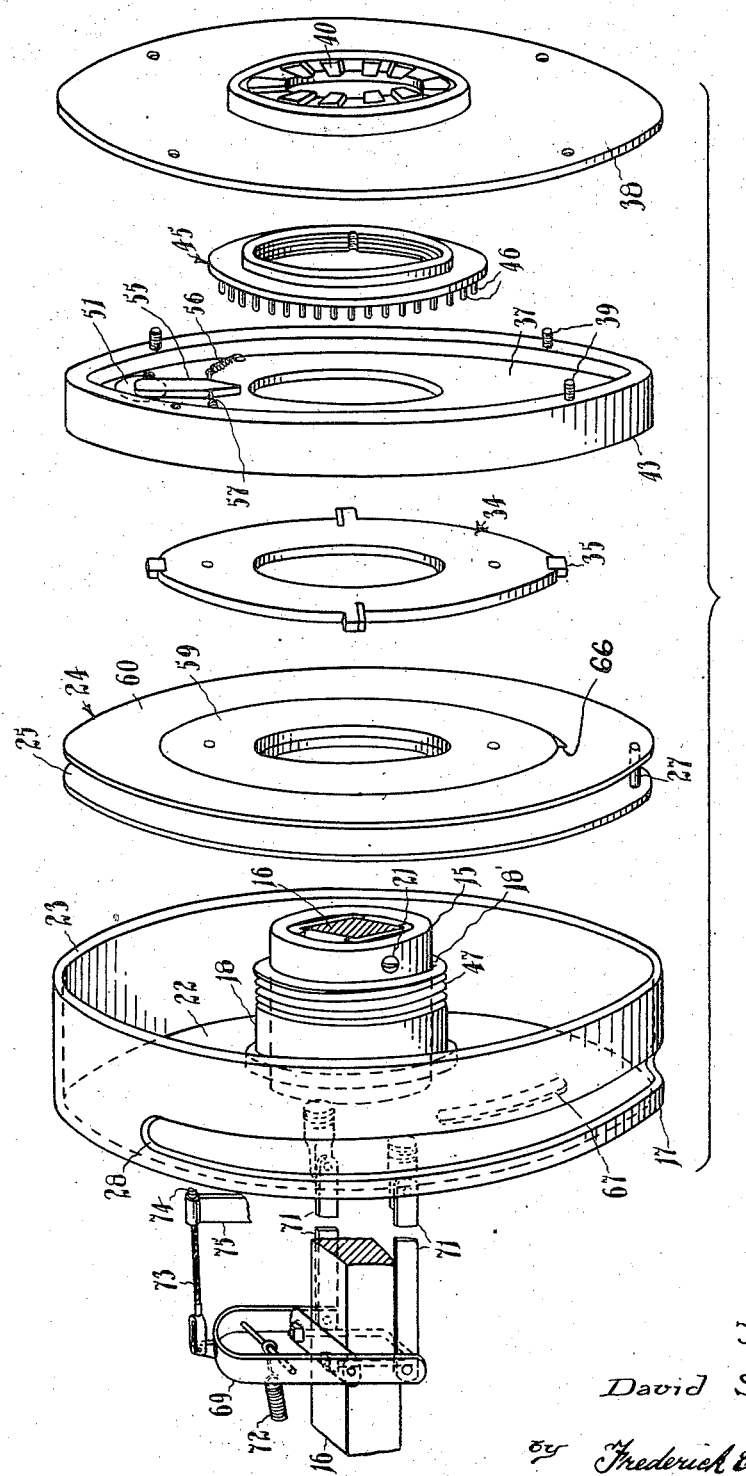

Sept. 14, 1948.　　　　　D. S. YOUNG　　　　　2,449,189
　　　　　　　　　　　　　HORSE TIE
Filed Oct. 28, 1946　　　　　　　　　　　　4 Sheets-Sheet 3
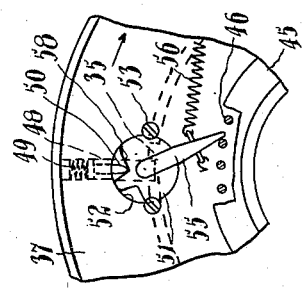
Inventor
David S. Young
By Frederick E. Bromley
　　　　　　ATTY.

Sept. 14, 1948.   D. S. YOUNG   2,449,189
HORSE TIE

Filed Oct. 28, 1946   4 Sheets-Sheet 4

Inventor
David S. Young
by Frederick E. Bromley
ATTY.

Patented Sept. 14, 1948

2,449,189

UNITED STATES PATENT OFFICE 2,449,189

HORSE TIE

David S. Young, Toronto, Ontario, Canada, assignor of one-half to Wesley Thompson, London, Ontario, Canada Application October 28, 1946, Serial No. 706,273

19 Claims. (Cl. 280—192)

My invention relates to horse ties adapted for checking a horse and stopping it running away by winding a flexible element on a sheave.

Primarily my invention has for its object to provide a checking device for attachment to a horse-drawn vehicle so devised that when the horse starts forward of its own accord its head will be drawn in or backward by a connection with the bridle-bit to bring the animal to a standstill. The checking device is suited to be set for operation while a vehicle is temporarily at rest, as for example, when a driver of a commercial vehicle is making a delivery of a commodity. A salient feature of the construction is that the device includes a novel clutch mechanism which automatically releases the backward pull on the horse's head when the animal is brought to a stop.

A further distinctive feature of the construction is that as long as the checking device is set to operate by a manual control the clutch will effect the checking pull on the horse's head each time the animal starts forward of its own accord and will release the checking operation each time the horse is brought to a stop. By successively checking a horse in this way it is trained to realize that it is under control at all times and therefore will be cured of the habit of starting off.

Another and important feature of the present proposal is to provide an automatic release for the checking device so that when a checking pull has been exerted sufficient to bring a horse to a stop the horse's head will be relieved of this restraining force. Although the checking pull on the bridle-bit soon brings a horse to a stop there is a natural tendency for a horse to back in being pulled to a stop. The automatic release provides a safety device for disengaging the sheave at a predetermined point so that no further checking pull may be exerted even if the horse is not brought to a halt.

The invention may be readily installed on an ordinary vehicle and its advantages and utility will be obvious to those familiar with the art.

Having recounted the major objects and advantages of the invention other objects and salient features of construction will be apparent from the ensuing specification considered in conjunction with the accompanying drawings.

The drawings illustrate one practical form of the invention which has proved to be entirely satisfactory, but it will be understood that such changes and modifications of the structure may be resorted to as come within the ambit of the subjoined claims.

In the drawing,

Fig. 3 is an exploded view of the clutch mechanism.

Fig. 4 is an axial section of the assembled clutch mechanism.

Fig. 5 is a fragmentary view of the clutch mechanism showing a cam-actuated trip by which the clutch is disengaged when the horse comes to a stop.

Fig. 6 is a similar view to Fig. 5 but showing the trip actuated by the cam.

Fig. 8 is a similar view to Fig. 5 but showing the cam moved to another position to which it shifts should a retaining spring break.

Fig. 11 is a sectional view of the release device.

Figure 1:
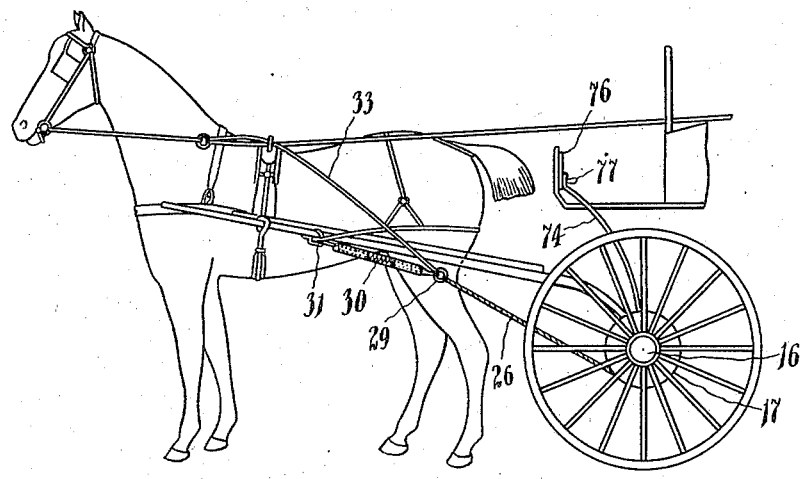
Fig. 1 is a view of the horse tie showing it applied to a wagon and connected to the bridle-bit of the horse.

In carrying out the invention I make use of a suitable sleeve 15 by which a square section of one of the axles, denoted at 16, of a vehicle is converted into a circular cross section in order to provide a bearing surface on which a drum is mounted to slide axially. The drum is denoted as a whole by the numeral 17 and has a hub 18 by which it is keyed, as at 18', on said sleeve against rotation. The drum forms a part of the clutch mechanism and is carried on the axle adjacent to a wheel thereof indicated at 19.

The sleeve 15 is fixedly secured to the axle 16 in approved manner as by means of adapter plates 20 which are tightened against the axle 16 by screws 21. The drum 17 includes the side wall 22 extending radially from the hub 18. This wall is disposed at the end of the hub remote from the wheel 19 and carries the annulus or rim 23. Within said drum is a sheave 24 rotatably mounted on its hub 18 in close proximity to the side wall 22. The sheave has a circumferential groove 25 in which an end of a flexible element, such as the cable 26, is secured for a winding operation. A pin 27 is used to fasten the cable to the sheave and a circumferential slot 28 is formed in the rim 23 of the drum in order that the cable may extend freely through the same.

The outer end of the cable 26 is connected at 29 to one end of a coil spring 30 which has its other end detachably connected at 31 to a shaft of the vehicle. The spring is under sufficient tension to normally hold the cable tautly extending from the sheave ready for winding thereon—see Fig. 1. The outer end of the cable is also connected to the bridle-bit 32 at each side of the horse's head as by means of a strap 33 which is shown as being fastened to the reins. By this arrangement it will be evident that when the sheave is turned in the forward direction of rotation of the vehicle wheels the cable in winding about the sheave will pull on the spring 30 and the bridle-bit. Normally the spring relieves the bridle-bit of any pull due to the connection with the cable.

At the outer side of the sheave 24 and secured thereto as a unit is a clutch plate 34 which forms a driven element of a clutch mechanism and is of a less diameter than the sheave. This driven plate is supplied with one or more peripheral teeth as at 35. Preferably four of such teeth are employed and arranged equidistantly around the periphery as will best be seen from an inspection of Fig. 3. The driven plate is depicted as secured to the sheave by screws 36 and it is free to turn on the hub 18 of the drum 17 in unison with the sheave for rotating the same for the purpose of winding the cable thereon as will later be explained in greater detail.

Figure 2:
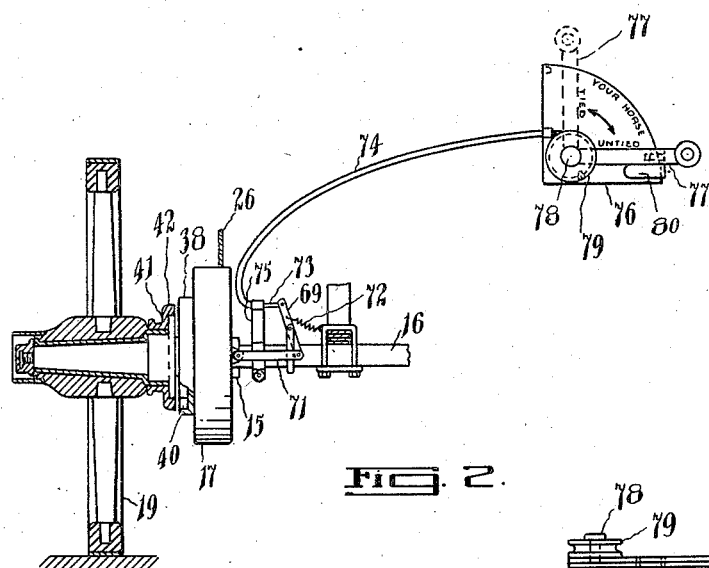
Fig. 2 is a side view partly in section of the horse tie showing how it is mounted on an axle of the vehicle for operation by a wheel thereof.
Figure 2A:
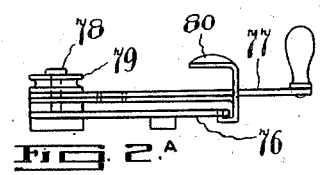
Fig. 2A is an edge view of the hand control shown in Fig. 2.

Alongside of the driven plate is a clutch plate 37 which forms the driving element therefor. This driving element is free to turn about the hub 18 and constitutes an inner driving plate and is rigidly secured to an outer driven plate 38 as by the fastening elements 39. The driven element 38 is provided with a circular arrangement of clutch teeth 40 on its outer face. These clutch teeth are disposed oppositely of the inner face of the wheel 19 as will be seen from an inspection of Fig. 2. Rigidly mounted on the inner end of the hub of the wheel 19 is a toothed ring 41 forming a driving element of a clutch, the teeth 42 of which are adapted to engage the teeth 40 of the driven element 38 by sliding the drum 17 along the sleeve 15 by means of a control device later to be explained. Normally the drum is positioned in spaced relation to the wheel 19 so that the teeth 40 are out of engagement with the teeth 42. The teeth 40 and 42 are brought into engagement only when it is desired that the apparatus shall operate to check the horse in the event of its starting up of its own accord. When the teeth 40 and 42 are engaged the wheel 19 serves to turn the driven element 38 forwardly in the event that the horse starts up. The inner driving plate 37 turns as a unit with the driven element 38 since it is fastened to the same.

The inner driving plate 37 is provided with a rim 43, one side of which freely encircles the teeth 35 of the driven element 34 and the other side of which serves as a spacer to form a chamber 44 inwardly of the driven element 38. In this chamber there is fixedly mounted a retaining ring 45 provided with an annular series of teeth 46. Ring 45 is shown as supplied with internal screw threads by which it is mounted on the threaded section 47 of the drum-hub 18. It is locked thereon against rotation as by a grub screw 48'. The teeth 46 are shown as being formed by laterally projecting pins but may be otherwise constructed if so desired. In the rim portion 43 of the driving plate 37 there is provided a radially arranged slide key 48 which is slidable to and away from the teeth 35 of the driven element 34 and resiliently held by a spring 49 in a projecting position so that when this driving element is turned it will be brought into engagement with one or another of the teeth 35. When such engagement is established during rotation of the plate 37 the plate 34 is caused to turn and this turns the sheave 24. Now, assuming that the non-rotatable drum 17 has been shifted along the sleeve to interlock the teeth 40 with the teeth 42, and that the wheel 19 is caused to turn forwardly by the starting up of the horse, it follows that the clutch plate 38 will be forwardly turned together with the plate 37. In consequence the sheave 24 will be turned in the same direction by reason of the engagement of the key 48 with one of the teeth 35. In this way the cable 26 is caused to wind on the sheave 24 against the tension of the spring 30 and to pull on the strap 33 to bring the horse to a stop. The checking action requires less than a complete turn of the sheave, and in order to automatically sever the driving connection with the wheel 19 when the horse comes to a standstill there is provided a trip mechanism for the key 48. The automatic trip mechanism utilizes the slight backward movement of the vehicle that ensues when the horse is stopped. In this movement the wheels roll backward as the vehicle comes to rest.

The trip mechanism comprises a finger 50 integral with the key and extended radially in inward direction alongside of the same with its terminus engaged with a cam 51. The cam is a circular member rotatably mounted on the driving plate 37 for turning about an axis parallel thereto. It is shown as disposed in a recess 52 in which it is retained by suitable means indicated at 53. The cam has a V-shaped notch 54, and the finger 50 is seated in the apex thereof under the stress of the spring 49 which retains the key 48 in position for engagement with one of the teeth 35. When the cam is turned the notch raises the finger 50 a distance sufficient to retract the key to a disengaged position. The cam is turned by a wiper bar 55 rigid therewith and extended radially thereof for engaging and riding on the teeth 46 of the non-rotatable ring 45. The wiper bar 55 is swingable from side to side about the cam axis and is stressed to an intermediate position, indicated in Fig. 6, by coil springs 56 and 57 connected thereto and anchored on the plate 37.

Figure 7:
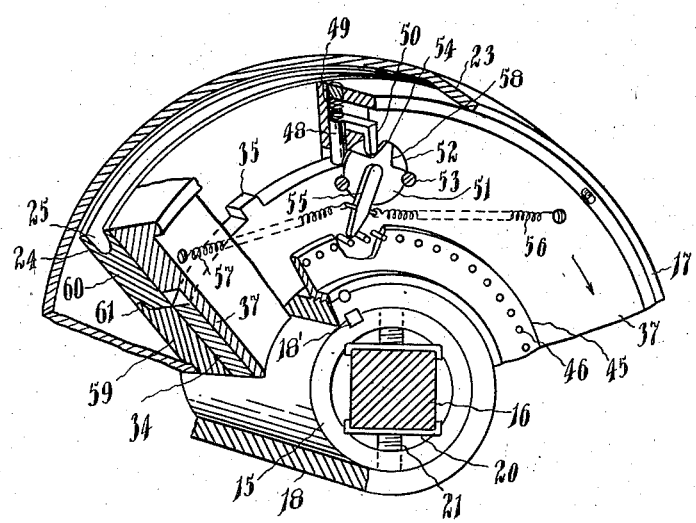
Fig. 7 is a fragmentary view in perspective showing the clutch mechanism to better advantage.

It will be recalled that the cable 26 normally retains the sheave in a regular position by reason of its connection with the spring 30. In that position the key 48 is projected by the spring 49 to engage one of the teeth 35 and the finger 50 is engaged in the notch 54 of the cam 51. In this normal position of the cam the wiper bar is pressed against the teeth 46 of the non-rotatable ring 45 by the spring 56 and it is inclined at a backward angle with respect of the forward direction of rotation of the plate 37, indicated by the arrow in Figs. 5 and 7, in which the sheave is turned to wind the cable in a checking operation. Assuming that the drum has been shifted along the sleeve to engage the clutch teeth 40 with the teeth 42 on the wheel 19 and that the horse starts up, the driving plate 37 will be turned forwardly and at the same time the driven plate 34 will be turned by the key 48 to wind the cable 26 on the sheave. In the forward rotation of the driving plate 37 the wiper bar rides over the teeth 46 without disturbing the engagement of the finger 50 with the cam 51. When the horse is fully checked and comes to a stop the vehicle in coming to stop has an attendant backward settling motion which, although slight, is sufficient to impart a backward angular movement to the wheels thereof. Hence the backward movement of the wheel 19 is imparted to the driving plate 37 with the consequence that the distal end of the wiper bar 55 drops between two adjacent teeth of the series 46 in the reverse movement whereby the wiper bar 55 swings inwardly to the radial position shown in Fig. 6. In swinging to this position the cam 51 turns with it and the finger 50 is raised out of the notch 54 with the result that the key 48 is withdrawn from engagement with the driven plate 37, which instantly releases the sheave and allows the cable to unwind under the tension of the spring 26. Should the horse start off again a recurrent checking action will automatically take place and will be followed by a release operation. The horse is controlled in this manner as long as the clutch teeth 40 and 42 are engaged. It will be noted that the cam 51 is provided with a second notch 58. This is a duplicate of the notch 54 and is provided as a safety measure so that should the spring 57 break, the device will continue to function as indicated in Fig. 8.

Figures 9, 10:
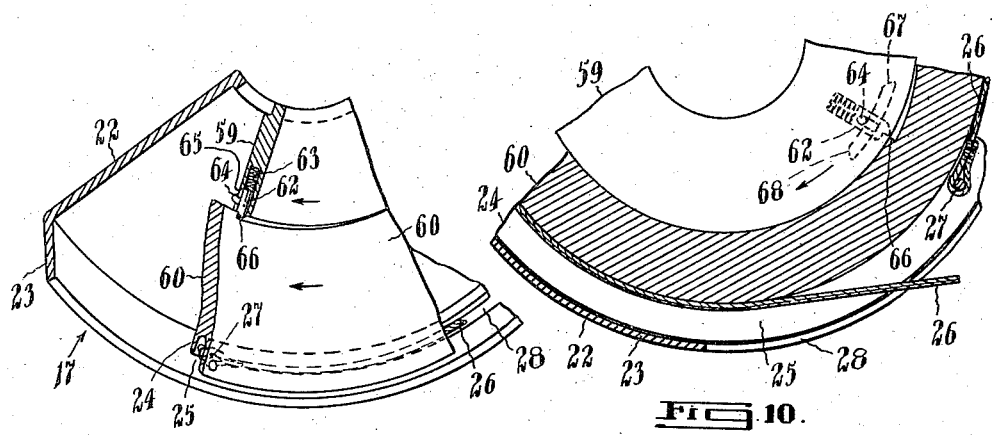
Fig. 9 is a fragmentary view in perspective showing the automatic release device.
Fig. 10 is a similar view of the release device but showing it in disengaged position.

As has been previously stated, the checking device is provided with an automatic safety mechanism for release of the sheave at a predetermined point so that no further pull can be exerted by the cable in a checking operation. This safety mechanism guards against any untoward action in the use of the apparatus and is in the form of a trip device for preventing the sheave from turning beyond a given point in the winding of the cable thereon. In the construction of this trip mechanism the sheave 24 is made in two parts, one of which is an inner ring 59 and the other is an outer ring 60 in which the groove 25 is formed for the cable 26. Said outer ring is made a running fit on the inner ring and is shouldered thereon at its inner side by means of a flange 61. The driven plate 34 serves as a shoulder for its outer side and this driven plate is rigidly attached to the inner ring 59 as by said screws 36. In the inner ring 59 there is mounted a dog 62 which is slidable radially and projected peripherally by a spring 63. The dog is limited in its slide movement by a pin 64 which projects through a slot 65 toward the side wall 22 of the drum 17. Said dog is normally engaged with a tooth 66 formed in the bore of the outer ring 60 so as to form a driving connection by which the outer ring is turned forwardly with the inner ring when the latter is driven by the plate 34. On the inner face of the side wall 22 of the drum there is fixed a cam plate 67 which extends circularly for a short distance and has inclined ends 68. This cam plate is disposed in the path of the pin 64 and so located that one of its beveled ends makes contact with the pin as the sheave is turned forwardly through nearly a complete revolution. As the beveled end makes contact it depresses the dog 62 and disengages it from the tooth 66, thereby severing the driving connection with the outer ring 60 so that the cable may unwind to release the pull on the bridle-bit. In the continued turn of the inner ring 59 the pin 64 slides along the bottom face of the cam plate, as shown in Fig. 10, until it is freed by coming to the end thereof. Figs. 9, 10 and 11, more particularly detail the trip mechanism.

The manual control for shifting the drum 17 along the sleeve in order to bring the clutch teeth 40 into engagement with the teeth 42 and to disengage them, comprises a lever 69 pivoted as at 70 intermediate of its length to the axle 16 and having one of its ends connected to the drum by links 71. Said lever is stressed by a tension spring 72 in order that the connection will slide the drum along the sleeve toward the wheel 19 to engage the teeth 40 and 42. The other end of said lever is connected to the inner member 73 of a Bowden wire 74. The flexible element 74 has its outer member connected at one end to a bracket 75 on the axle 16, and has its other end connected to a quadrant 76. The quadrant is fixed to the body of the vehicle and located conveniently to the driver. It is supplied with a hand lever 77 pivoted at 78, which has a circular grooved part 79 connected to said inner member 73. The hand lever is latched, as at 80, in a normal position, indicated in full lines in Fig. 2, so as to retain the lever 69 in a position in which it holds the clutch teeth 40 out of engagement. When the apparatus is to be set for operation the lever 77 is shifted to the position indicated in dash lines in Fig. 2, which slackens the inner member of the Bowden wire and allows the spring 72 to slide the drum toward the wheel 19 so that the teeth 42 will engage those on the wheel.

From the preceding description it will be manifest that the invention produces a highly efficient and reliable horse tie, and is not necessarily confined to the specific details of construction herein disclosed, but may be modified within the scope of the appended claims.

What I claim is:

1. A checking device for a horsedrawn vehicle comprising in combination a support, a sheave rotatably mounted on said support, a cable attached to said sheave for connection to the bridle of the horse, a first clutch for forwardly turning said sheave including a driving element journalled on said support, means providing radial teeth on said sheave, and a spring-projected key slidably mounted on said driving element for engaging said radial teeth; a second clutch, said second clutch being operable by manual control for establishing a driving connection between said driving element of the first clutch and a wheel of the vehicle; and a trip mechanism for said key comprising a pivoted cam radially disposed on said driving element and provided with a notch, a finger engaged in said notch and carried by said key, a circular series of fixed teeth mounted on said support concentric with said driving element, a wiper bar rigidly carried by said cam having an end for riding on said circular series of teeth, and spring means urging said wiper bar to drop into an interdental space of said circular series of fixed teeth.

2. A checking device as set forth in claim 1 in which a spring forms a connection between the cable and a part of the vehicle in order to return the sheave to a normal position following an operational movement, said spring being arranged so as to relieve the bridle of strain due to its connection therewith.

3. A checking device as set forth in claim 1 in which the pivoted cam has a peripheral cam surface forming the notch therein, and in which the finger is rigid with the key and disposed to engage in the notch of said cam so as to be ejected therefrom when said cam is turned by an actuating movement of the wiper bar in dropping into an interdental space of said circular series of fixed teeth.

4. A checking device as set forth in claim 1, in which the wiper bar rests on the circular series of fixed teeth at a backward angle with respect to the forward direction in which the sheave turns in an operational movement, and in which the wiper bar is swingable from side to side and is pressed by the spring means to an intermediate position radially of the sheave when the driving element comes to rest after an operative movement.

5. In a checking device for a horsedrawn vehicle, a support, a sheave journalled on said support for winding a cable, clutch teeth on said sheave, a driving element journalled on said support, a slide key on said driving element resiliently projected to engage one or another of said teeth, a pivoted cam radially disposed on said driving element having a peripheral cam surface, a finger on said sheave engaged with said cam and arranged to be actuated by said cam surface for disengaging said key, a circular series of non-rotatable teeth mounted on said support concentric with said driving element, a wiper bar rigidly carried by said cam having an end for riding on said circular series of non-rotatable teeth, and spring means urging said wiper bar to drop into an interdental space of said circular series of non-rotatable teeth.

6. In a checking device for a horsedrawn vehicle, a drum non-rotatably mounted on a wheel-axle of the vehicle, a sheave rotatable on the drum, a cable forming a connection between the bridle of the horse and said sheave, a driving element having a clutch connection with a wheel of said axle for turning said sheave with this wheel, and means interposed between said sheave and said driving element for automatically releasing the sheave when said wheel comes to rest with an attendant backward roll, said means comprising a tooth rigid with the sheave, a plate rotatable with the driving element, a key thereon resiliently depressed to engage said tooth, a cam rotatable on said plate provided with a notch, a finger engaged in said notch and carried by said key, a circular series of fixed teeth, a wiper bar for rotating said cam having an end for riding on said circular series of fixed teeth, and spring means urging said wiper bar to drop into an interdental space of the circular series of fixed teeth.

7. In a checking device for a horsedrawn vehicle, a drum non-rotatably mounted on a wheel-axle of the vehicle, a sheave rotatable on the drum, a cable forming a connection between the bridle of the horse and said sheave, a driving element having a clutch connection with a wheel of said axle for turning said sheave with this wheel, a driven plate rotatable with said sheave, a tooth projecting from the periphery thereof, a driving plate rotatable with said driving element, a spring-pressed key carried by said driving plate for engaging said tooth in the rotation thereof, a stationary series of teeth encircling the drum-axis, and a cam mechanism for releasing said key including a spring-pressed wiper bar for riding on said stationary series of teeth in the forward rotation of said driving element and adapted to engage in an interdental space of the series of teeth to actuate said cam mechanism as said wheel comes to rest with an attendant backward motion.

8. A structure as set forth in claim 7, in which the drum has a hub by which it is fixed on the wheel-axle, and in which the sheave is rotatably mounted on said hub and rigidly connected to the driven plate.

9. A structure as set forth in claim 7, in which the driven plate is journalled on the drum and provided with a plurality of spaced teeth projecting radially of its periphery, and in which the key is projected inwardly in radial direction between adjacent teeth on the driven plate for engaging one of them.

10. A structure as set forth in claim 7, in which the cam mechanism comprises a finger rigid with the key, and a cam pivoted on the driving plate radially of the axis thereof, said cam being provided with a notch forming a cam surface which is engaged by said finger for disengaging said key.

11. A structure as set forth in claim 7, in which the cam mechanism includes a pivoted cam on the driving plate having a peripheral cam surface, and in which the wiper bar radially extends from the cam and is urged to an operative position by springs at either side thereof.

12. In a checking device for a horsedrawn vehicle, a drum adapted to be non-rotatably mounted on a wheel-axle of the vehicle with its axis concentric with the axis of the wheel, said drum having an apertured rim, a sheave rotatable in the drum, a cable connected to said sheave and extended through the apertured rim of the drum for connection to the bridle of the horse, a tension spring adapted to be connected to the shaft of the vehicle for holding the cable taut with the sheave in a regular angular position, a driving element encircling the drum-axis having a clutch for establishing a driving connection for said sheave with a wheel on said axle, a driven plate in the drum rigid with said sheave and having a tooth projecting from its periphery, a driving plate encircling said driven plate and rigid with said driving element, a slide key on said driving plate resiliently projected to engage said tooth, a finger on said key, a cam pivoted on said driving plate having a notch engaged by said finger, a wiper bar extending from said cam for turning it to cause said notch to raise the finger for disengaging the key, a stationary series of spaced teeth encircling the axis of the drum and spring means tensioning said wiper bar against said teeth.

13. In a checking device for a horsedrawn vehicle, a drum slidably mounted on a wheel-axle of the vehicle and restrained against rotary movement, a sheave rotatable on said drum, a cable forming a connection between the bridle of the horse and said sheave, a driving element on said drum mounted to slide as a unit therewith, means forming a driving connection between said driving element and said sheave, a trip device for release of said driving connection, clutch teeth on said driving element, clutch teeth on a wheel of said axle, and a hand control for sliding said drum to effect engagement of said clutch teeth, said hand control comprising a spring urging the drum toward said wheel, a lever pivotally supported intermediate of its length, links connecting an end of said lever to the drum, a flexible element connected to the other end of said lever, a quadrant, a hand lever pivoted thereon and having a circular grooved part about its pivot to which said flexible element is attached for winding thereon, and means for latching said hand lever.

14. A structure as defined in claim 6, in which the clutch connection of the driving element is provided with a hand control.

15. A structure as defined in claim 13, in which the drum has a hub loosely fitted on a sleeve secured on the wheel-axle to serve as an adapter for providing a circular bearing surface.

16. In a checking device for a horsedrawn vehicle, a sheave journalled on a wheel-axle of the vehicle, a cable extending from the sheave for connection with the bridle of the horse, means for establishing a driving connection between a wheel on said axle and said sheave, and means for severing the driving connection while said means is operating, said latter means comprising inner and outer rings forming elements of the sheave and mounted for relative rotation, said inner ring being driven by the first mentioned means, a tooth provided on said outer ring, a spring-projected dog on said inner ring engaged with said tooth, and a cam plate rigidly supported in the path of travel of said dog for disengaging the same at a predetermined point in the forward rotation of said sheave.

17. In a checking device for a horsedrawn vehicle, a drum non-rotatably mounted on a wheel-axle of the vehicle by means of a hub portion, a sheave rotatable on the hub of the drum adjacent to a side wall of the drum, said sheave having an inner ring and an outer ring mounted for relative rotation, a cable for connecting the sheave to the bridle of the horse, said outer ring having a groove for the winding of the cable, a tooth on the outer ring, a dog slidable on the inner ring, a spring projecting the dog into engagement with the tooth for driving the outer ring, a pin on the dog projecting toward the side wall of the drum, a cam plate on said side wall in the path of travel of the pin and having a surface for depressing the pin to disengage the dog at a predetermined point in the rotation of the sheave, and means connected to said inner ring for establishing a driving connection with a wheel on said axle.

18. A structure as set forth in claim 17, in which the means connected to the said inner ring for establishing the driving connection with a wheel includes a manually operable clutch.

19. A structure as set forth in claim 17, in which the last mentioned means includes a clutch mechanism having a device by which it is disengaged when the horse is checked and the vehicle comes to a stop with an attendant backward movement of its wheels.

DAVID S. YOUNG.

REFERENCES CITED

The following references are of record in the file of this patent:

UNITED STATES PATENTS

| Number | Name | Date |
| --- | --- | --- |
| 1,155,403 | Butler | Oct. 5, 1915 |
| 1,187,080 | Miller | June 13, 1916 |